United States Patent
Honda et al.

(10) Patent No.: US 9,484,154 B2
(45) Date of Patent: Nov. 1, 2016

(54) CAPACITOR DEVICE AND METHOD FOR MANUFACTURING SAME

(75) Inventors: Ikufumi Honda, Tokyo (JP); Nobukatsu Abe, Tokyo (JP); Tsubasa Abe, Tokyo (JP)

(73) Assignee: NIPPON CHEMI-CON CORPORATION, Shinagawa-Ku, Tokyo (JP)

( * ) Notice: Subject to any disclaimer, the term of this patent is extended or adjusted under 35 U.S.C. 154(b) by 172 days.

(21) Appl. No.: 13/816,388

(22) PCT Filed: Jul. 20, 2011

(86) PCT No.: PCT/JP2011/066404
§ 371 (c)(1),
(2), (4) Date: Feb. 11, 2013

(87) PCT Pub. No.: WO2012/020624
PCT Pub. Date: Feb. 16, 2012

(65) Prior Publication Data
US 2013/0141850 A1    Jun. 6, 2013

(30) Foreign Application Priority Data

Aug. 12, 2010 (JP) ................. 2010-180689
Sep. 30, 2010 (JP) ................. 2010-223069

(51) Int. Cl.
*H05K 7/00* (2006.01)
*H01G 4/38* (2006.01)
(Continued)

(52) U.S. Cl.
CPC .................. *H01G 4/38* (2013.01); *H01G 2/02* (2013.01); *H01G 2/04* (2013.01); *H01G 2/10* (2013.01); *H01G 11/10* (2013.01); *H01G 11/82* (2013.01); *Y02E 60/13* (2013.01); *Y10T 29/43* (2015.01)

(58) Field of Classification Search
CPC ... H05K 5/0056; H05K 5/0021; H05K 5/003
USPC ................ 361/814, 821, 830, 517–520, 522, 361/328–329; 307/147, 148, 150; 318/439, 318/538, 722, 801; 320/107, 320
See application file for complete search history.

(56) References Cited

U.S. PATENT DOCUMENTS 2,790,111 A * 4/1957 Calling .................... 361/825
5,751,253 A * 5/1998 Wells ........................ 343/749
(Continued)

FOREIGN PATENT DOCUMENTS

JP    5-292756 A    11/1993
JP    6-62527 U    9/1994
(Continued)

*Primary Examiner* — Hung S Bui
(74) *Attorney, Agent, or Firm* — Taft Stettinius & Hollister LLP

(57) ABSTRACT

An object of the invention is to provide a capacitor device that can be made slimmer and lighter and that enables the strength and heat dissipation properties to be improved. A capacitor device (1) has a plurality of capacitor units (2) integrally housed within a housing case (3), the housing case (3) having cylindrical housing sections (5) for housing the capacitor bodies. The housing sections (5) are longitudinally aligned in the same direction and are joined together as an integrated whole. A capacitor unit (2) is inserted via an opening (9) at one end of each of the housing sections (5) so that the entire circumference of the capacitor unit (2) is covered by the corresponding housing section (5). The housing sections (5) have a uniform thickness at least on the outer side along the outer periphery of the capacitor units.

1 Claim, 16 Drawing Sheets

(51) Int. Cl.
*H01G 2/04* (2006.01)
*H01G 2/10* (2006.01)
*H01G 11/10* (2013.01)
*H01G 11/82* (2013.01)
*H01G 2/02* (2006.01)

(56) References Cited

U.S. PATENT DOCUMENTS

| | | | |
|---|---|---|---|
| 6,249,422 B1 * | 6/2001 | Tsai | 361/301.3 |
| 7,069,649 B2 * | 7/2006 | Tsunezaki et al. | 29/832 |
| 7,547,233 B2 * | 6/2009 | Inoue et al. | 439/627 |
| 7,764,496 B2 * | 7/2010 | Nguyen et al. | 361/697 |
| 2004/0136170 A1 | 7/2004 | Tsunezaki et al. | |
| 2006/0120012 A1 | 6/2006 | Tsunezaki et al. | |
| 2008/0211309 A1 * | 9/2008 | Nolte | 307/66 |
| 2008/0280192 A1 * | 11/2008 | Drozdz et al. | 429/62 |
| 2009/0021890 A1 | 1/2009 | Bourcier et al. | |

FOREIGN PATENT DOCUMENTS

| | | |
|---|---|---|
| JP | 2000-195748 A | 7/2000 |
| JP | 2001-6972 A | 1/2001 |
| JP | 2004-185867 A | 7/2004 |
| JP | 2004-221182 A | 8/2004 |
| JP | 2005-311154 A | 11/2005 |
| JP | 2008-543083 A | 11/2008 |
| JP | 2010-63355 A | 3/2010 |

* cited by examiner

CAPACITOR DEVICE AND METHOD FOR MANUFACTURING SAME

TECHNICAL FIELD

The present invention relates to a capacitor device where a plurality of capacitor units is housed as an integral whole in a housing case as well as to a method for manufacturing the same.

BACKGROUND ART

Conventional devices with attached capacitors allow capacitors to be inserted into a plurality of holes created in a metal block (see Patent Document 1). In addition, there have been capacitor devices where a capacitor provided with a thermal contracting resin tube around it is attached to a holder having a housing section of which the upper surface is open and the cross-section is in arc form, and the resin tube is heated in a state where the resin tube has been pulled out to the outside through the opening of the holder so as to contract, and thus, the capacitor is held in place (see Patent Document 2).

PRIOR ART DOCUMENTS

Patent Documents

Patent Document 1: Japanese Unexamined Utility Model Publication H6 (1994)-62527
Patent Document 2: Japanese Unexamined Patent Publication 2004-221182

SUMMARY OF THE INVENTION

Problem to be Solved by the Invention

In the device with attached capacitors in Patent Document 1, a plurality of holes is created in a metal block, and therefore, there are such problems that the weight of the device with attached capacitors cannot be reduced, the appearance is bulky, and the heat dissipation properties are poor. In addition, in the capacitor device in Patent Document 2, an opening through which a resin tube is pulled out to the outside must be created in the holder, and such a problem arises that this opening lowers the strength of the holder.

The present invention is provided in view of these problems, and an object of the invention is to provide a capacitor device that can be made slimmer and lighter and that enables the strength and heat dissipation properties to be improved as well as a method for manufacturing the same.

Means for Solving Problem

In order to achieve the above-described object, the capacitor device according to the present invention, where a plurality of capacitor units are integrally housed in a housing case, is characterized in that the above-described housing case has cylindrical housing sections for housing the capacitor units, the cylindrical housing sections are longitudinally aligned in the same direction and are joined together as an integrated whole, the above-described capacitor units are inserted via an opening at an end of the respective housing sections so that the entire circumference of the capacitor units is covered by the corresponding housing sections, and the housing sections have a uniform thickness at least on the outer side along the outer periphery of the above-described capacitor units. According to this feature, a plurality of capacitor units is joined together as an integrated whole in such a state that the entire circumference of the capacitor units is held by the housing sections, and the size of the housing sections can be matched with the size of the capacitor units so that the housing sections can be made slimmer and lighter. In addition, the uniform thickness of the housing sections on the outer side along the outer periphery of the capacitor units makes it possible to reduce the weight of the housing case while increasing the strength of the housing case, and at the same time to increase the surface of the housing case, and thus, the heat dissipation properties can be improved.

The capacitor device according to the present invention is characterized in that a plurality of housing sections that form the outer periphery of the above-described housing case is aligned in annular form, and the housing sections along the outer periphery of the housing case have a uniform thickness at least on the outer side along the outer periphery of the above-described capacitor units. According to this feature, the housing sections have a uniform thickness on the outer side along the outer periphery of the capacitor units, and at the same time, a plurality of housing sections that form the outer periphery of the housing case is aligned in annular form, and thus, the area of the outer surface of the housing case can be increased in order to improve the heat dissipation properties and the strength of the housing case can be increased.

The capacitor device according to the present invention is characterized in that the housing sections along the outer periphery of the above-described housing case are aligned in rotation symmetry. According to this feature, uniform force is applied to the housing sections in the outer periphery of the housing case when an external force is applied to the housing case, and thus, the strength of the housing case is increased so that the housing case can be prevented from being deformed.

The capacitor device according to the present invention is characterized in that the above-described housing sections are aligned in staggered form. According to this feature, part of another housing section can be provided between adjacent housing sections so that the housing case can be made slimmer.

The capacitor device according to the present invention is characterized in that a gap is created between the inner surface of the above-described housing sections and the outer surface of the above-described capacitor units so that the gap is filled in with a resin material. According to this feature, the outer periphery of the capacitor units adheres to the inner surface of the housing sections via the resin material so that the capacitor units are firmly secured within the housing sections, and at the same time, the heat conductivity to the housing case is enhanced by the resin material so that the heat dissipation properties are increased.

The capacitor device according to the present invention is characterized in that the opening of the above-described housing sections is closed by a closing member. According to this feature, it is easy to provide the resin material such that the closing member can prevent the resin material from flowing out before hardening.

The capacitor device according to the present invention is characterized in that the above-described closing member is provided with a support for holding a capacitor unit in such a state that a uniform gap is created along the outer surface of the capacitor unit. According to this feature, the support uniformly maintains the gap so that the resin material is uniformly filled in around the capacitor units, and thus, the strength in the connection between the capacitor units and the housing sections as well as the heat conductivity can be prevented from being uneven.

The capacitor device according to the present invention is characterized in that the above-described housing case is formed through extrusion molding. According to this feature, the housing case can be easily mass-produced so that the capacitor device can be manufactured at a low cost.

The capacitor device according to the present invention is characterized in that a circuit case for housing a circuit unit for electrically connecting the above-described capacitor units is provided at one end of the above-described housing case, and an attachment member for attaching the above-described circuit case is fixed to an attachment portion that is formed together with the above-described housing sections at the time of the above-described extrusion molding. According to this feature, the attachment portion that is formed together with the housing sections at the time of extrusion molding can be used to secure the circuit case, and thus, it is not necessary to separately form a portion for attaching a circuit case on the housing case, and thus, the cost for manufacture of the housing case can be reduced.

The capacitor device according to the present invention is characterized in that the above-described closing member and the circuit case are structurally integrated. According to this feature, the closing member and the circuit case are structurally integrated, and therefore, the attachment to the housing case is easy.

The capacitor device according to the present invention is characterized in that the above-described housing case has a positioning unit in which a connection member for connecting another housing case in its longitudinal direction is to be positioned. According to this feature, the capacitor device runs in the longitudinal direction of the housing case so as to have such a form as to be compact in the direction of the width, and the capacitance can be increased.

The capacitor device according to the present invention is characterized in that the above-described positioning unit is formed in a location surrounded by the housing sections along the outer periphery of the above-described housing case. According to this feature, the connection member in the positioning unit is not exposed to the outside of the housing case, and thus, the connection member can be prevented from corroding, and at the same time, the heat emitted from the capacitor units and the load of the capacitor units are uniformly transferred and applied to the surroundings of the connection member, and therefore, the connection member can be prevented from distorting due to the effects of the heat or the load.

The method for manufacturing a capacitor device according to the present invention is a method for manufacturing a capacitor device where a plurality of capacitor units is integrally housed in a housing case and is characterized in that in the housing case having cylindrical housing sections for housing a plurality of capacitor units, where the housing sections are longitudinally aligned in the same direction and are joined together as an integrated whole, and the housing sections have a uniform thickness at least on the outer side along the outer periphery of the above-described capacitor units, the above-described capacitor units are inserted via an opening at an end of the respective housing sections so that the entire circumference of the capacitor units is covered by the corresponding housing sections. According to this feature, a plurality of capacitor units is joined together as an integrated whole in such a state that the entire circumference of the capacitor units is held by the housing sections, and the size of the housing sections can be matched with the size of the capacitor units so that the housing sections can be made slimmer and lighter. In addition, the uniform thickness of the housing sections on the outer side along the outer periphery of the capacitor units makes it possible to reduce the weight of the housing case while increasing the strength of the housing case, and at the same time to increase the surface of the housing case, and thus, the heat dissipation properties can be improved.

The method for manufacturing a capacitor device according to the present invention is characterized in that a gap is created between the inner surface of the above-described housing sections and the outer surface of the above-described capacitor units, and the gap is filled in with a resin material. According to this feature, the outer periphery of the capacitor units adheres to the inner surface of the housing sections via the resin material so that the capacitor units are firmly secured within the housing sections, and at the same time, the heat conductivity to the housing case is enhanced so that the heat dissipation properties are increased.

PREFERRED EMBODIMENTS OF THE INVENTION

The capacitor device according to the present invention is described below on the basis of the embodiments for implementing the invention.

First Embodiment

Figure 1:
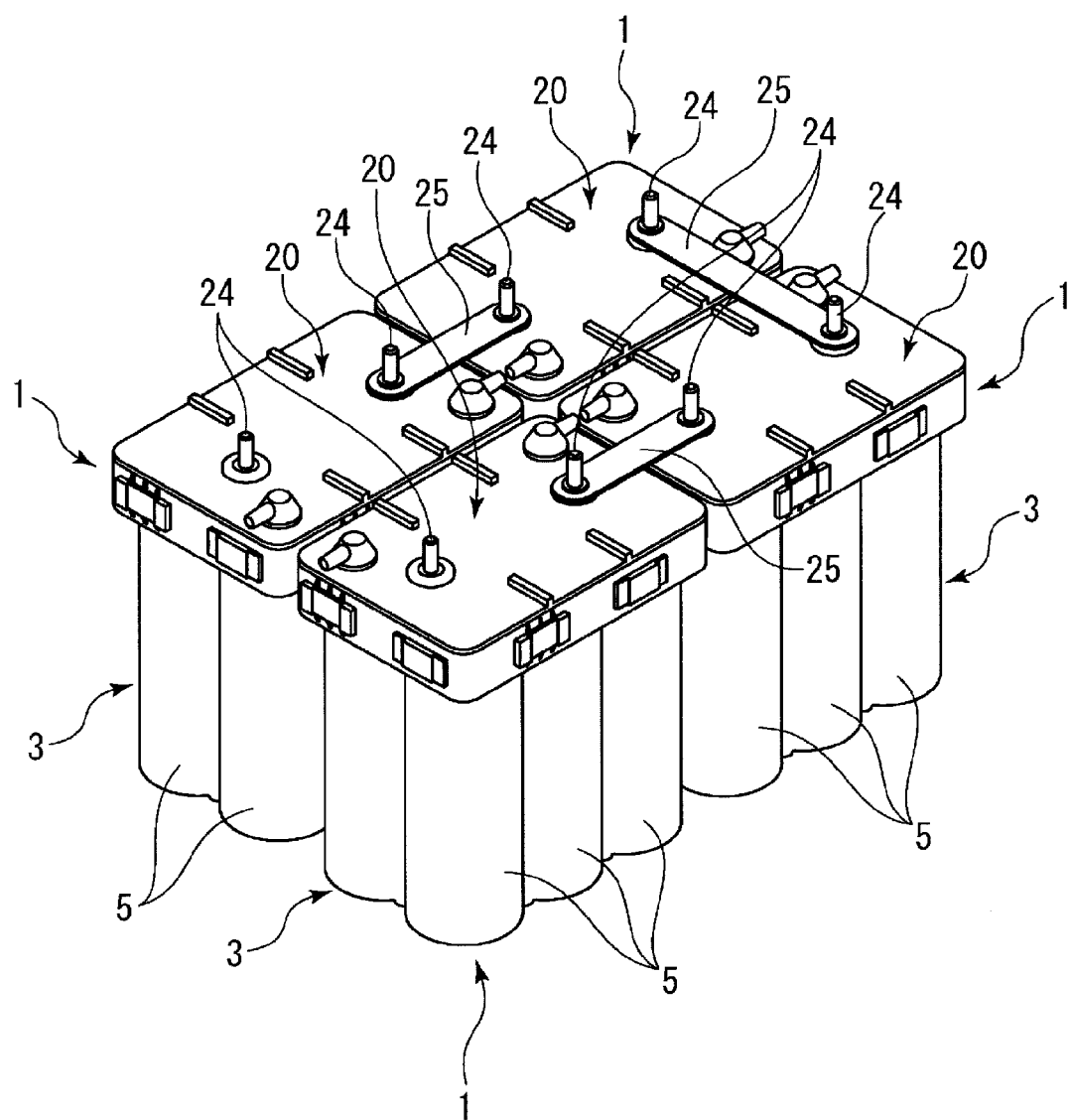
FIG. 1 is a perspective diagram showing the capacitor device according to the first embodiment.

The capacitor device according to the first embodiment is described below in reference to FIGS. 1 to 6. The symbol 1 in FIG. 1 is the capacitor device to which the present invention is applied. In the first embodiment, four capacitor devices 1 are joined together horizontally. Here, these capacitor devices 1 are mainly installed in apparatuses for vehicles or the like for use.

Figure 2:
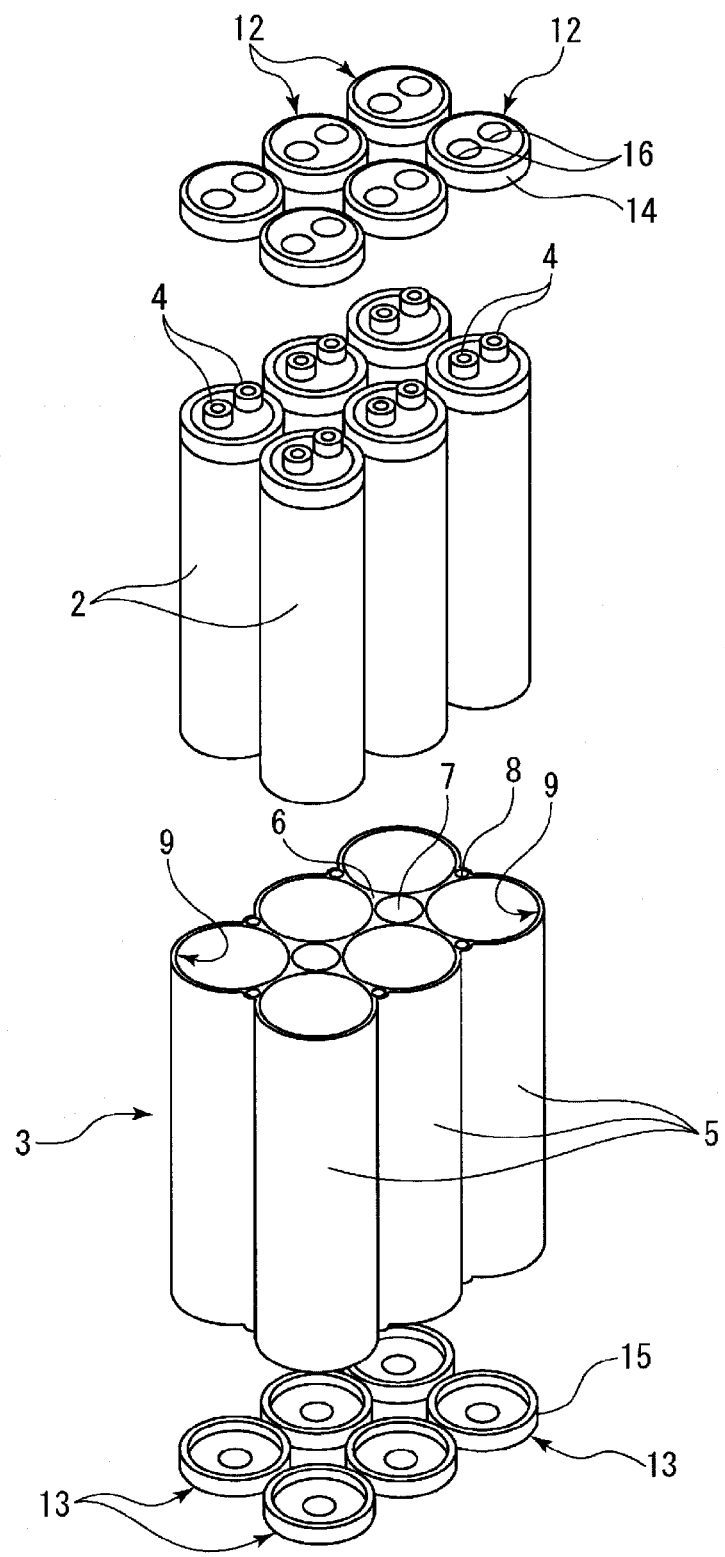
FIG. 2 is an exploded perspective diagram showing the capacitor device.

As shown in FIG. 2, one capacitor device 1 integrally houses six capacitor units 2 in a housing case 3. In the present embodiment, an electric double-layer capacitor is used for each capacitor unit 2. These capacitor units 2 are approximately in cylindrical form, and anode and cathode terminals 4 are provided on the top of the capacitor units 2. In addition, six housing sections 5 for housing the capacitor units 2 are created in the housing case 3.

The housing case 3 is formed of a metal material, such as aluminum, through extrusion molding using a die. When the housing case 3 is formed through extrusion molding, the housing case 3 can be easily mass produced so that the capacitor device 1 can be manufactured at a low cost. In addition, the housing sections 5 are approximately in cylindrical form that matches the shape and the size of the capacitor units 2.

Figure 5:
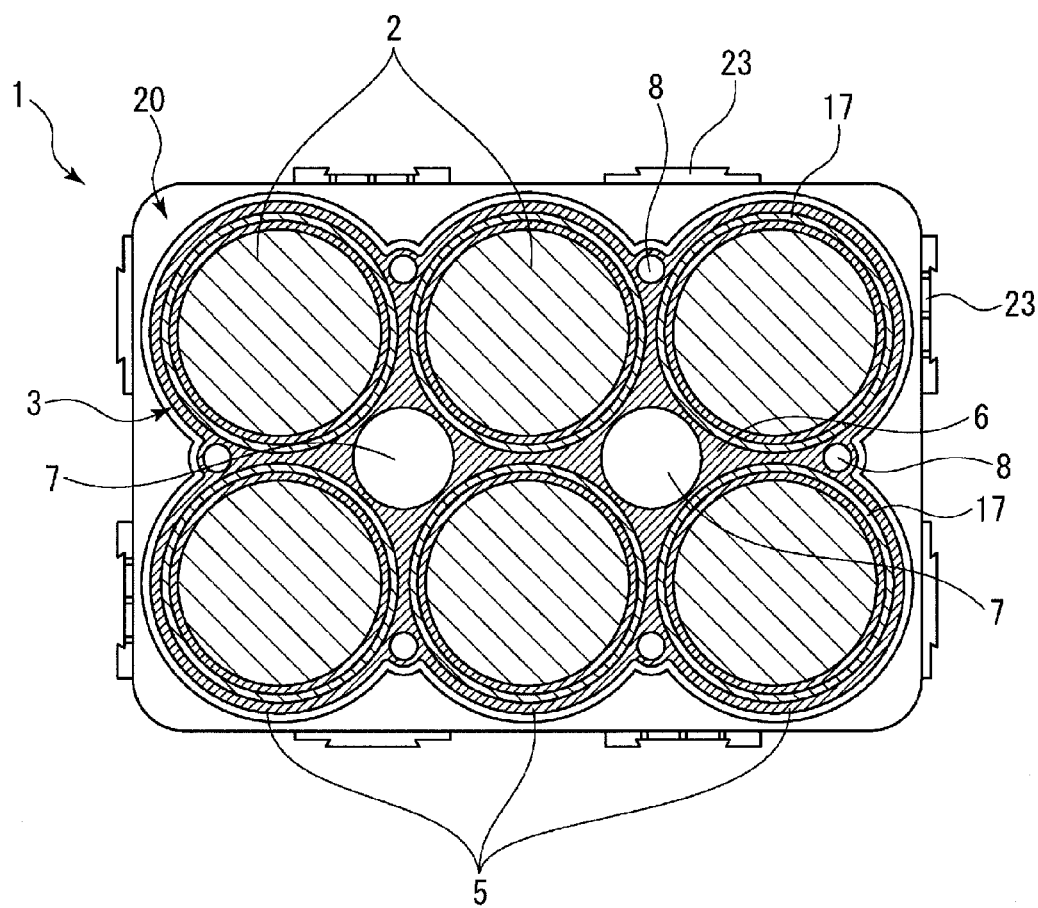
FIG. 5 is a cross-sectional diagram showing the capacitor device as viewed from the bottom side.

As shown in FIG. 5, the housing sections 5 are longitudinally aligned in the same direction and at least parts of them are integrally joined together. Though in the present embodiment, the housing sections 5 are integrally joined together through the entire surface in their longitudinal directions, only parts of them in the longitudinal direction, for example, only the sides on the upper end or on the lower end, may be joined together. In addition, the housing sections are aligned in grid form as viewed from the top, and the shape of the housing case 3 is approximately rectangular parallelepiped. Here, three housing sections 5 are aligned in series from the left to the right in a column, and two columns are side-by-side in the front and rear so as to provide the arrangement of the housing sections 5 in grid form. Furthermore, the joining portion 6 for joining the housing sections 5 together has holes with a large diameter 7 and holes with a small diameter 8 (attachment portions), which are created together with the housing sections 5 at the time of extrusion molding for the housing case 3.

Figure 4:
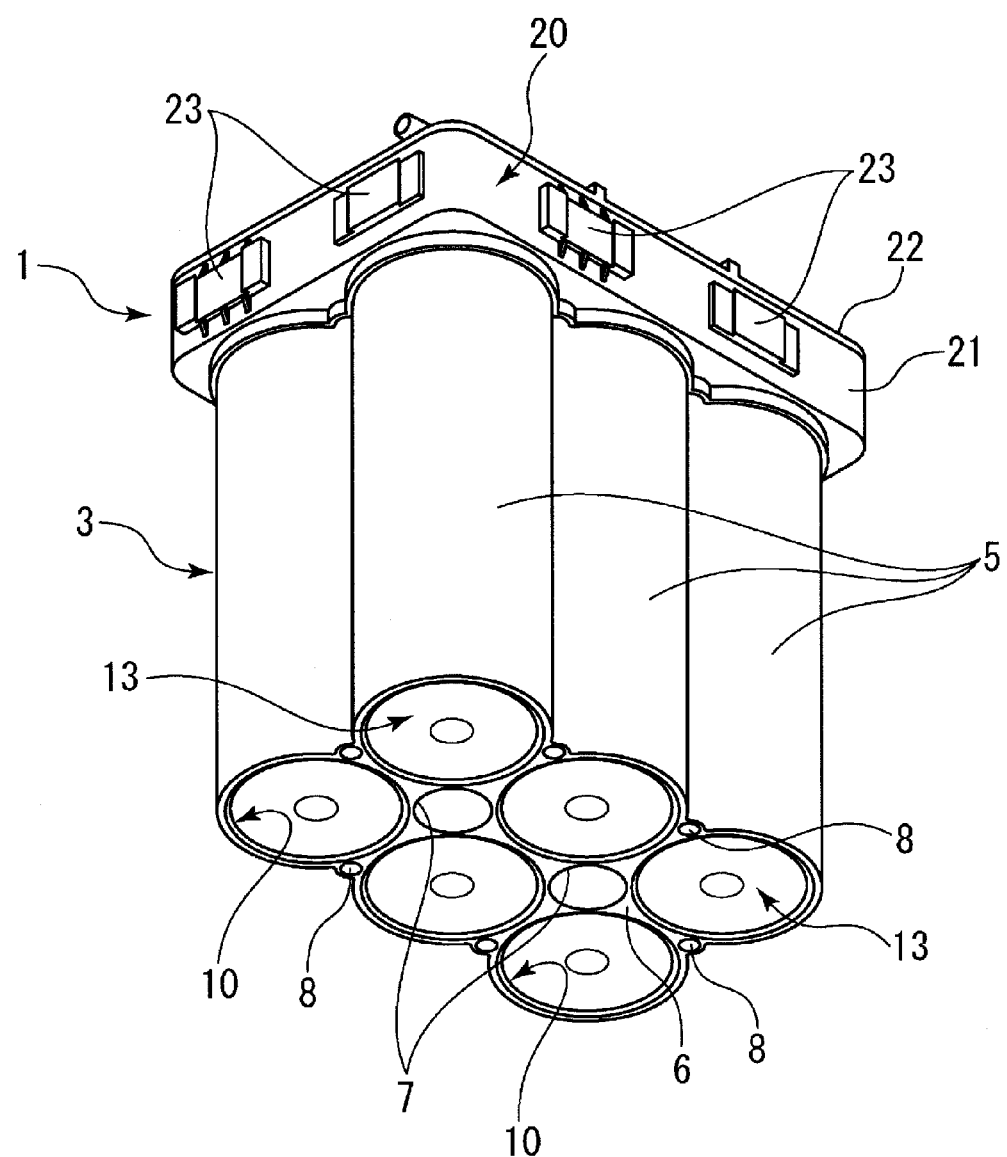
FIG. 4 is a perspective diagram showing the capacitor device as viewed from the bottom side.

As shown in FIGS. 2 and 4, the housing sections 5 and the holes with a large diameter 7 penetrate through the housing case 3 from the top to the bottom. In addition, the holes with a small diameter 8 are provided in order for the below-described other members to be fixed with screws, and may penetrate through the housing case 3 from the top to the bottom or may have a certain depth from the top or from the bottom. Furthermore, the holes with a large diameter 7 are placed inside the housing case 3, and at the same time, the holes with a small diameter 8 are placed between the housing sections 5 on the outside of the housing case 3 so that the housing case 3 can be made slimmer.

Figure 3:
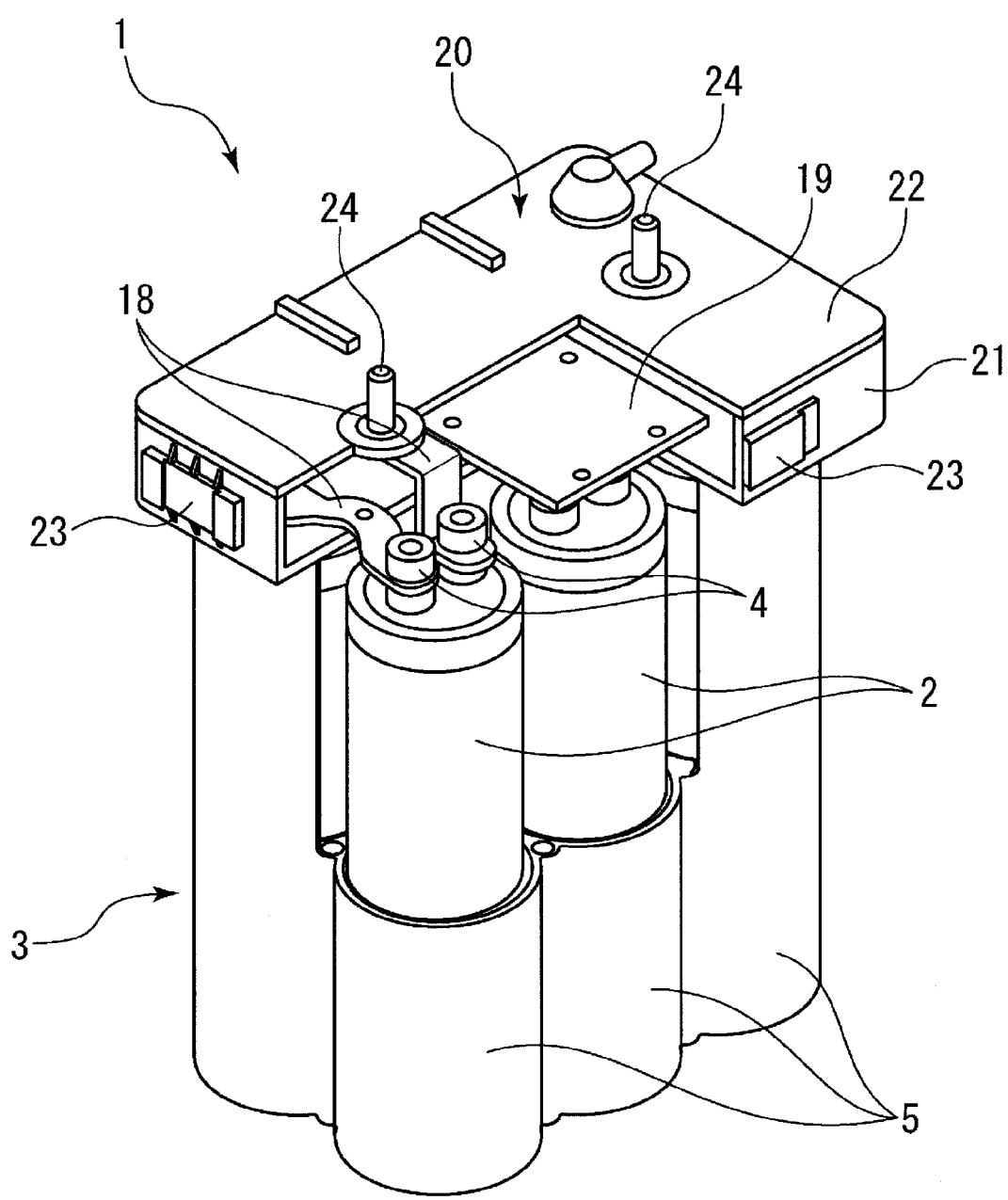
FIG. 3 is a perspective diagram showing the capacitor device in a state where a section is omitted.

As shown in FIGS. 2 and 3, the capacitor units 2 are inserted through the openings 9 on the top of the housing sections 5 and held in such a state that the entire circumference of the sides of the capacitor units 2 is covered by the housing sections 5. Here, at least a part of each housing section 5 (portion other than the joining portion 6) is exposed on the outer side, and on this outer side the housing section 5 has a uniform thickness along the outer periphery of the capacitor unit 2. In addition, the inner diameter of the housing sections 5 is slightly greater than the outer diameter of the capacitor units 2 so that a gap 11 with a predetermined size S is created between the outer periphery of the capacitor unit 2 housed in a housing section 5 and the inner surface of the housing section 5 (see FIG. 6). In the present embodiment, the size S of the gap 11 is approximately 0.5 mm to 3.0 mm, taking into consideration the heat conductivity and the below-described efficiency for filling in the gap with a resin.

As shown in FIGS. 2 and 4, the openings 9 and 10 on the top and at the bottom of the housing sections 5 are closed by the upper and lower caps 12 and 13 (closing members) that fit into the openings. These upper and lower caps 12 and 13 are approximately in disc form, and the holding pieces 14 and 15 (holding portions) for holding the upper and lower ends of the capacitor units 2 are formed around the entire circumference of the caps. Here, the leading holes 16 for leading out the terminals 4 of a capacitor unit 2 are created in the upper caps 12. Furthermore, the upper and lower caps 12 and 13 have such a function as to close the housing sections 5 for moistureproofing. In addition, a hole may be separately provided in the upper caps 12 in such a location as to correspond to a pressure releasing mechanism provided on the top of the capacitor units, though not shown, so that the pressure within a capacitor unit can be released through the hole when the pressure releasing mechanism is in operation.

Figure 6:
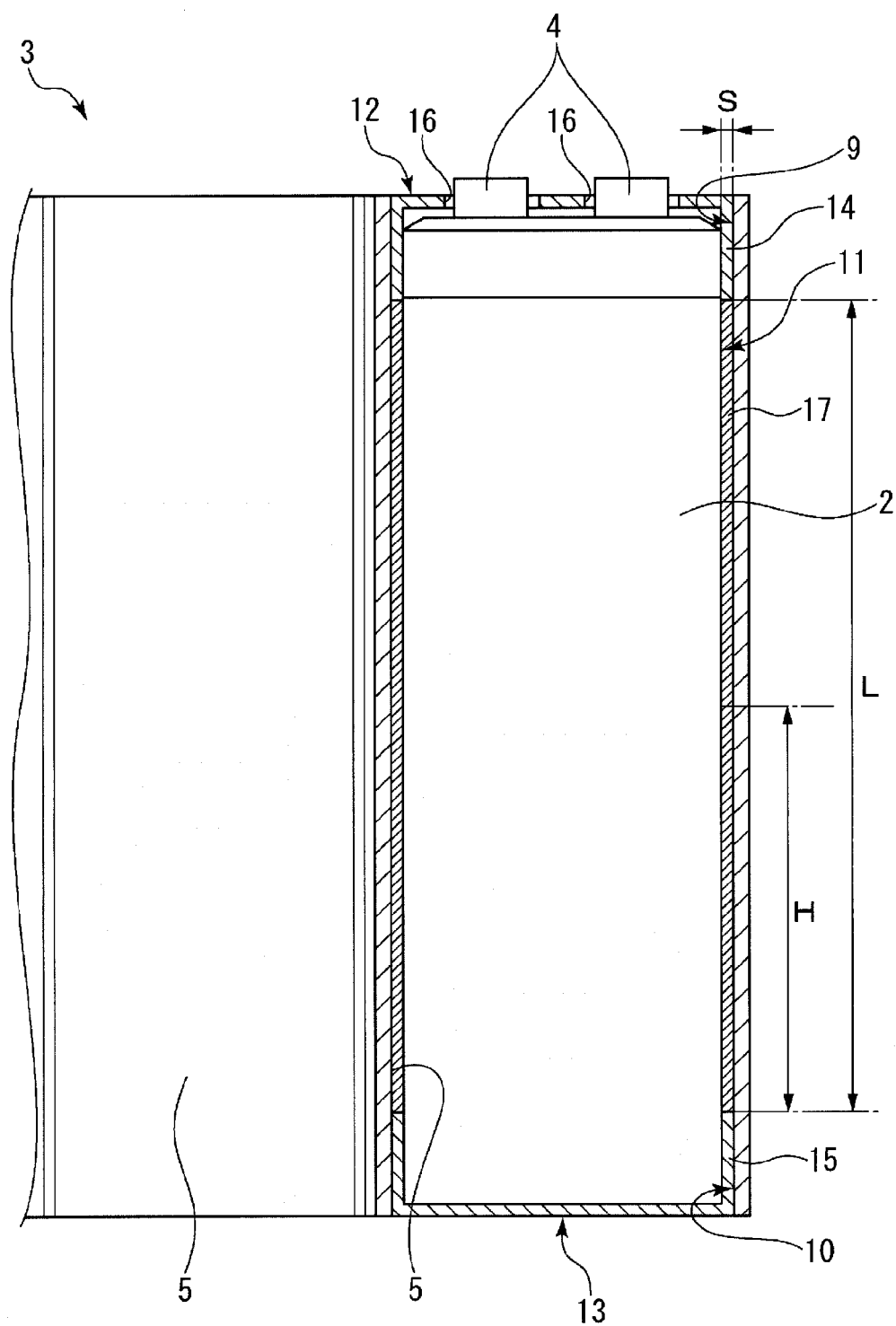
FIG. 6 is a cross-sectional diagram showing the capacitor device with part of the housing case omitted as viewed from the front.

Here, the thickness of these holding pieces 14 and 15 is the same as the size of the above-described gap 11 (see FIG. 6). The lower caps 13 allow the holding piece 15 to be engaged with the bottom end of the capacitor unit 2 so that the holding piece 15 prevents the capacitor unit 2 from shaking and the size S of the gap 11 becomes uniform along the outer periphery of the capacitor unit 2. Here, unevenness or undulation may be created in a part of the outer periphery of the holding pieces 14 and 15 that makes contact with the inner surface of the housing section 5, though not shown, so that the engagement with the housing section 5 is enhanced and the tightness in closing the housing sections 5 by the upper and lower caps 12 and 13 can be enhanced.

As shown in FIGS. 5 and 6, the gaps 11 are filled in with a resin material 17 that is a synthetic resin having heat conductivity, such as an epoxy resin or a urethane resin. By doing this, the outer periphery of the capacitor units 2 is adhered to the inner surface of the housing sections 5 through the resin material 17 so that the capacitor units 2 are firmly secured within the housing sections 5, and at the same time, the heat conductivity to the housing case is increased through the resin material 17 so as to increase the heat dissipation properties. Here, it is preferable for the entirety of the gaps 11 between the outer periphery of the capacitor units 2 and the inner surface of the housing sections 5 to be filled in with the resin material 17.

According to one of the methods for filling in the gaps with this resin material 17, first, the capacitor units 2 are inserted into the housing sections 5 and the openings 10 at the bottom of the housing sections 5 are closed with the lower caps 13, and at the same time, the gaps 11 are created when the holding pieces 15 of the lower caps 13 hold the capacitor units 2, and in this state, the melted resin material 17 is flown into the gaps 11 through the openings 9 on the top. Here, the entirety L of the gaps 11 may be filled in with the resin material 17 or the portion H that is approximately half of the gaps 11 may be filled in with the resin material 17, of which the amount for use can be appropriately adjusted.

According to another filling in method, first, the openings 10 at the bottom of the housing sections 5 are closed with the lower caps 13, and in this state, a predetermined amount of melted resin material 17 is flown into the housing sections 5, and after that, the capacitor units 2 are inserted into the housing sections 5. The melted resin material 17 is pushed up along the gap 11 as the capacitor units 2 are inserted so that the entirety L of the gaps 11 is filled in. In the case where the entirety L of the gaps 11 is not sufficiently filled in, the melted resin material 17 can further be flown into the gap 11 through the openings 9 of the housing sections 5 so that the entirety L of the gaps 11 can be filled in.

According to still another method, the openings 10 of the housing sections 5 at the bottom are closed with the lower caps 13, the capacitor units 2 are inserted into the housing sections 5, and the openings 9 of the housing sections 5 on the top are closed with upper caps 12, in which an injection hole is separately provided, and in this state, a predetermined amount of melted resin material 17 is flown into the housing sections 5 through the injection holes in the upper caps 12 under reduced pressure. In this case, the resin material covers the top of the capacitor units 2, which increases the effects of moistureproofing and improves the stability of the housing case 3. In the case where a pressure releasing mechanism is provided on the top of the capacitor units 2, a partition may be provided around the pressure releasing mechanism so that the pressure releasing mechanism is not covered by the resin material with which the gap is filled in, or an exhaust hole from the pressure releasing mechanism to the outside of the capacitor device (such as a tube) may be provided.

Thus, the lower caps 13 can prevent the resin material 17 from flowing out before hardening, and at the same time, the holding pieces 15 hold the capacitor units so that the gaps 11 are uniform, which allows the gaps to be uniformly filled in with the resin material 17 around the capacitor units 2, and as a result, the strength for making connection between the capacitor units 2 and the housing sections 5 as well as the heat conductivity between the two can be prevented from becoming uneven.

As shown in FIGS. 3 and 4, in a state where the capacitor units 2 are housed in the housing case 3, a circuit case 20 for housing a circuit substrate 19 (circuit unit) provided with a connection member 18 (circuit unit) that electrically connects the terminals 4 of the capacitor units 2 to each other and a balance circuit and the like is attached to the top of the housing case 3. Here, this circuit case 20 is formed of a member in box shape 21 and a lid member 22. In addition, the circuit case 20 is secured to the holes with a small diameter 8 provided in the joining portion 6 of the housing case 3 by means of screws (attachment members) (not shown). Though it is preferable for the material of the circuit case to be an insulating resin material of a thermosetting resin, such as an epoxy resin or a phenol resin, or of a thermoplastic resin, such as polybutylene terephthalate or nylon, the material is not limited to these, and a metal material, such as aluminum or stainless steel, may be used. From among these, a polybutylene terephthalate resin having excellent heat stability is preferable.

By doing this, the circuit case 20 can be secured using holes with a small diameter 8 that are created together with the housing sections 5 at the time of extrusion molding, and thus, it is not necessary to separately form portions for attaching the circuit case 20 on the housing case 3 so that the cost for manufacture of the housing case 3 can be lowered. Furthermore, the outer surface of the housing sections 5 and the holes with a large diameter 7 function as a heat dissipating means for dissipating heat that has been conducted from the capacitor units 2 to the housing case 3. In addition, the holes with a large diameter 7 and the holes with a small diameter 8 can make the housing case 3 lighter.

As shown in FIGS. 1 and 3, connection portions 23 for connecting the circuit case 20 to other circuit cases are provided on the outer periphery of the circuit case 20, and thus, a plurality of capacitor devices 1 can be connected together by means of the connection portions 23. External connection terminals 24 are provided so as to protrude from the top of the circuit case 20. Here, when a plurality of capacitor devices 1 is joined together, the external connection terminals 24 are connected to each other by connection jigs 25. Here, the housing case 3 is approximately in rectangular parallelepiped form according to the present embodiment so that the layout can be made simple when the capacitor device 1 is mounted in a predetermined apparatus.

Next, the capacitor device 1a according to a modification is described below in reference to FIG. 7. Here, the same symbols are attached to the same components as in the above-described embodiment, and the same descriptions are not repeated.

Figure 7:
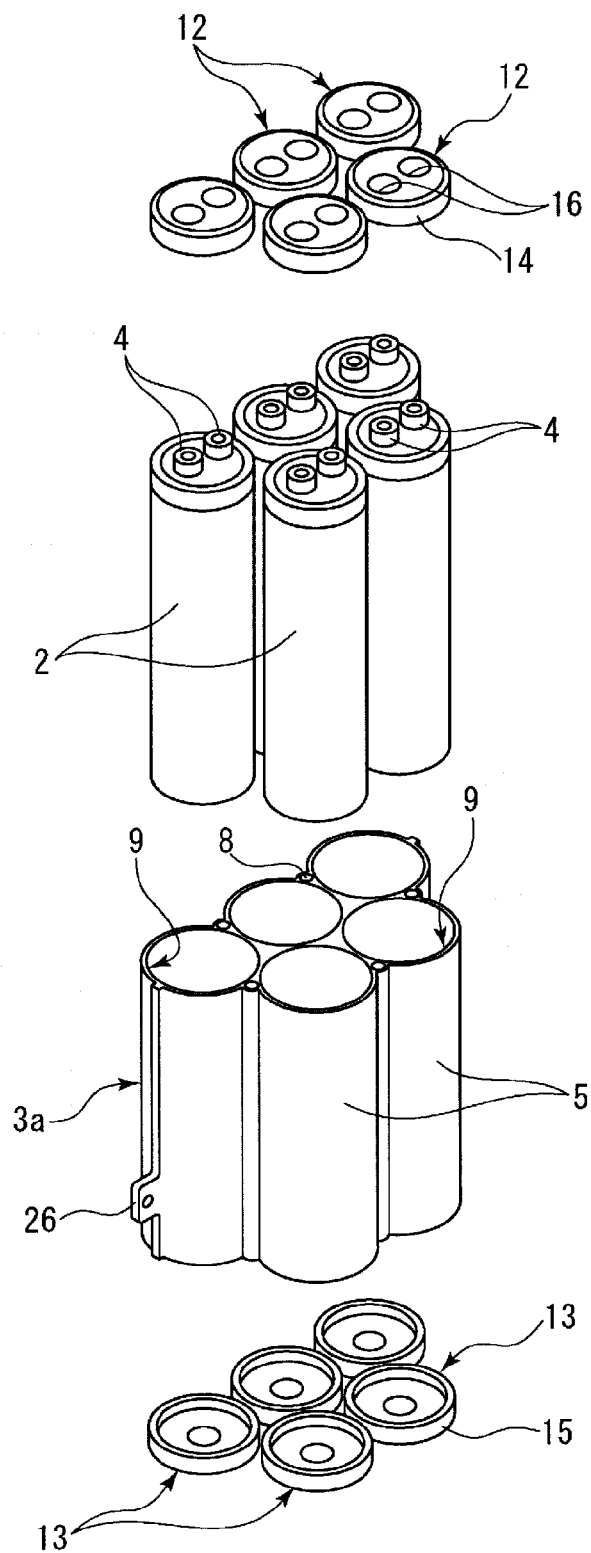
FIG. 7 is an exploded perspective diagram showing the capacitor device according to a modification.

As shown in FIG. 7, in the capacitor device 1a according to the modification, five capacitor units 2 are integrally housed in a housing case 3a. In addition, five housing sections 5 for housing a capacitor unit 2 are created in the housing case 3a.

As shown in FIG. 7, the housing sections 5 are aligned in a zigzag as viewed from the top. Here, three housing sections 5 out of five are aligned in series from left to right, and the other two housing sections 5 are placed between the housing sections 5 in the zigzag arrangement. Thus, a part of each housing section 5 is placed between two other housing sections 5 in the arrangement, which makes the housing case 3a slimmer. Here, attachments pieces 26 used when the housing case 3a is mounted in a predetermined apparatus are formed in the left and right end portions of the housing case. Furthermore, holes with a small diameter 8 (attachment portions) are provided in the joining portion 6 for joining the housing sections 5 together.

As shown in FIG. 7, as in the first embodiment, in the state where the capacitor units 2 are housed in the housing sections 5, the openings 9 and 10 on the top and at the bottom of the housing sections 5 are closed by the upper and lower caps 12 and 13 (closing members). Here, in the modification, the capacitor units 2 are arranged in zigzag form, and therefore, the terminals 4 are in close proximity to each other.

As described above, in the capacitor device 1 according the present modification, a plurality of capacitor units 2 is joined together as an integrated whole in such a state that the entire circumference of the capacitor units 2 is held by the housing sections 5, and the size of the housing sections 5 can be matched with the size of the capacitor units 2 so that the housing sections 5 can be made slimmer and lighter. In addition, the uniform thickness of the housing sections 5 on the outer side along the outer periphery of the capacitor units 2 makes it possible to reduce the weight of the housing case 3 while increasing the surface of the housing case, and thus, the heat dissipation properties can be improved.

Second Embodiment

Figure 10:
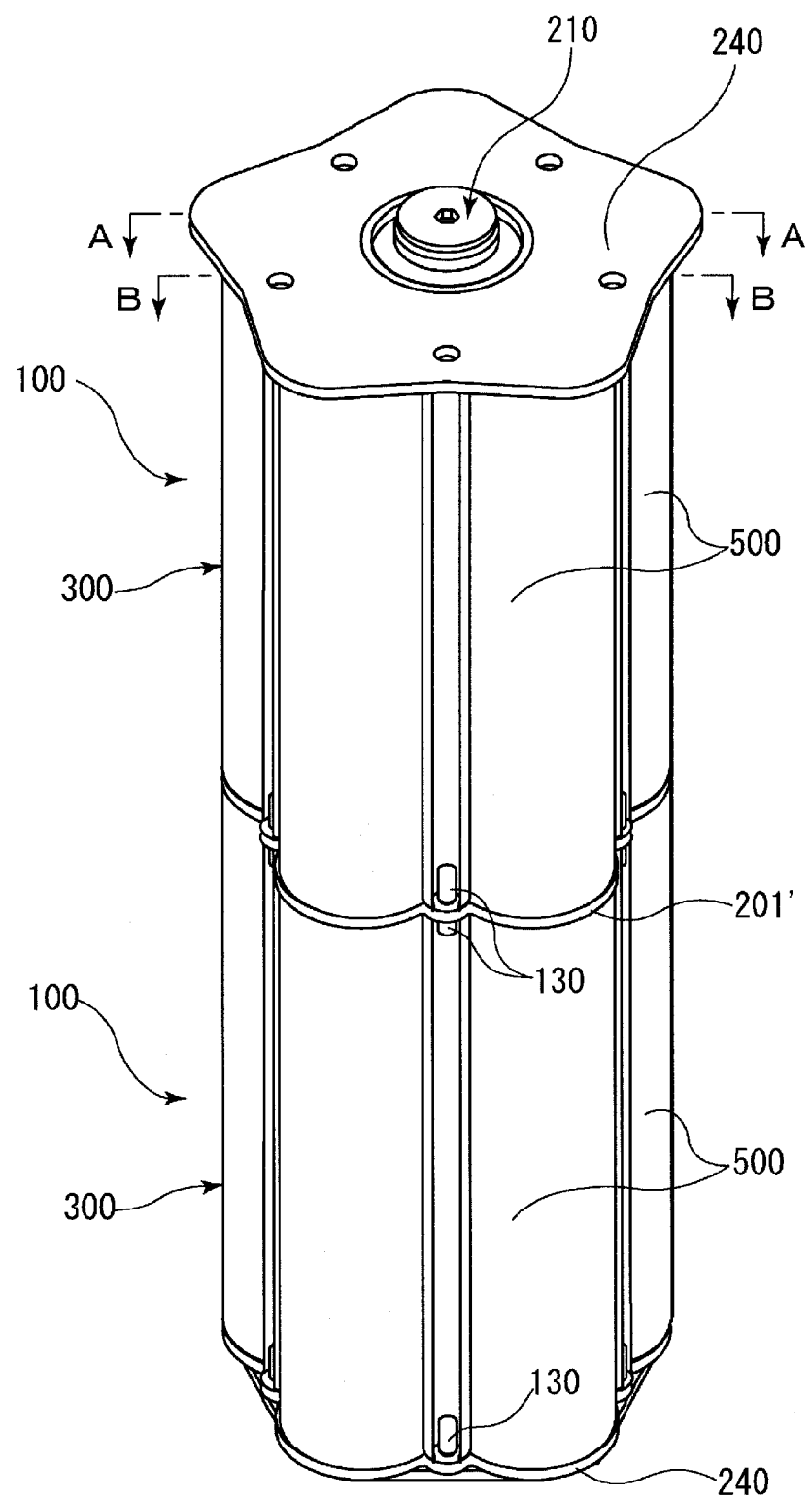
FIG. 10 is a perspective diagram showing two capacitor devices joined together according to the second embodiment.

The capacitor devices according to the second embodiment are described below in reference to FIGS. 10 to 15. The symbol 100 in FIG. 10 is the capacitor device to which the present invention is applied. In the second embodiment, two capacitor devices 100 are joined together in the upward and downward directions. These capacitor devices 100 are mainly mounted in an apparatus for vehicles or the like for use.

Figure 13:
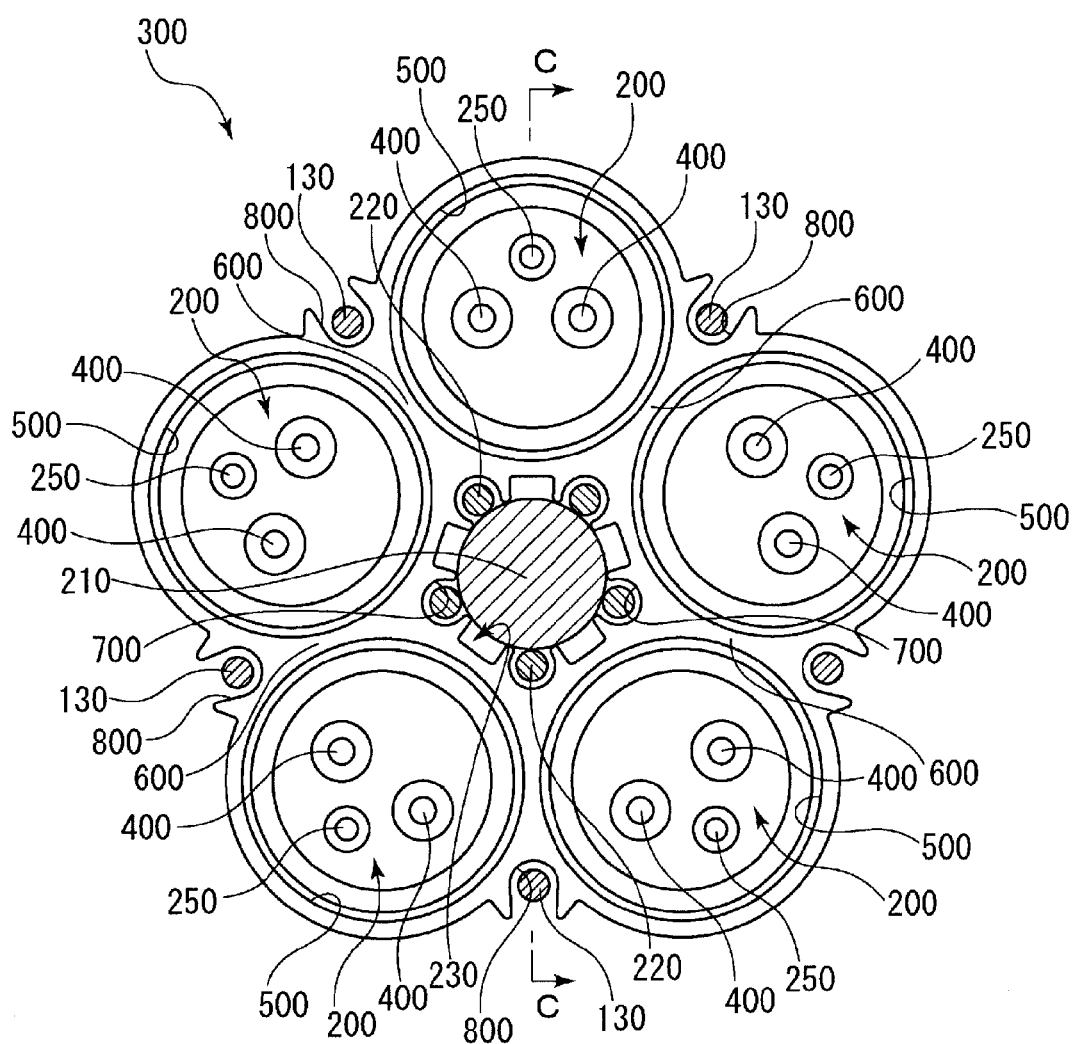
FIG. 13 is a plan diagram showing the housing case along B-B in FIG. 10.

As shown in FIG. 13, in one capacitor device 100, five capacitor units 200 are integrally housed in a housing case 300. Here, in the present embodiment, an electric double-layer capacitor is used for the capacitor units 200. These capacitor units 200 are approximately in cylindrical form, and anode and cathode terminals 400 are provided on the top of the capacitor units 200 (see FIG. 14). In addition, five housing sections 500 for housing a capacitor unit 200 are created in the housing case 300.

Figure 15:
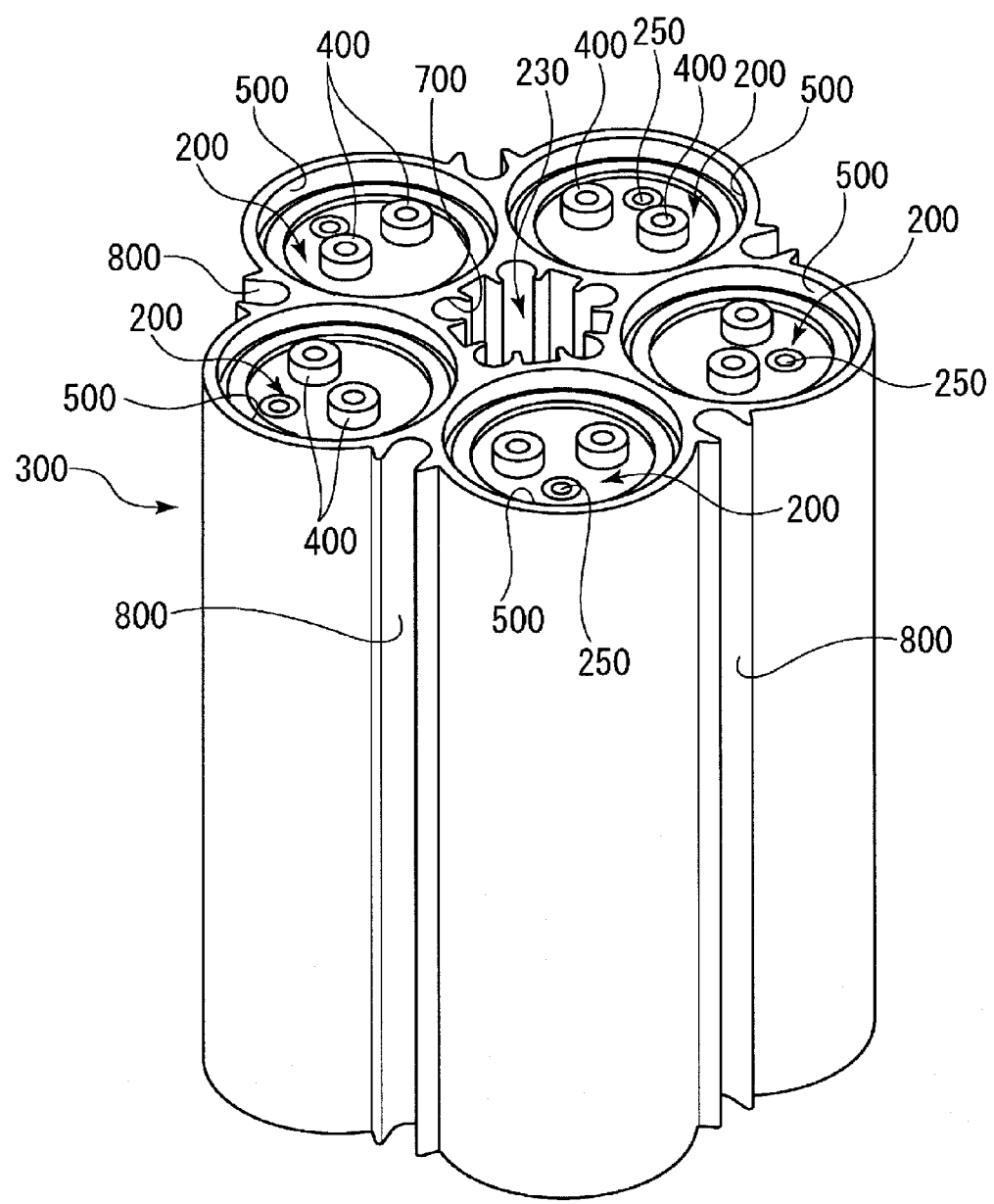
FIG. 15 is a perspective diagram showing the housing case.

As shown in FIG. 15, the housing case 300 is formed of a metal material, such as aluminum, through extrusion molding using a die. When the housing case 300 is formed through extrusion molding, the housing case 300 can be easily mass produced so that the capacitor device 100 can be manufactured at a low cost. In addition, the housing sections 500 are approximately in cylindrical form that matches the shape and the size of the capacitor units 200.

As shown in FIGS. 13 and 15, the housing sections 500 are longitudinally directed in the same direction and at least parts of them are integrally joined together. Though in the present embodiment, as shown in FIG. 15, the housing sections 500 are integrally joined together through the entire surface in their longitudinal directions, only parts of them in the longitudinal direction, for example, only the sides on the upper end or on the lower end, may be joined together. In addition, the housing sections 500 are arranged in annular form as viewed from the top. Here, a center portion 230 in which the below-described connection member 210 is placed is formed in the center portion of the housing sections 500 that are arranged in annular form.

Namely, the center portion 230 is provided at the center of the housing case 300 as viewed from the top, and at the same time, the five housing sections 500 are arranged in rotational symmetry with this center portion as an axis. By doing this, uniform force is applied to the housing sections 500 in the outer periphery of the housing case 300 when an external force is applied to the housing case 300, and thus, the strength of the housing case 300 is increased so that the housing case 300 can be prevented from being deformed.

Furthermore, small trenches 800 are created in the joining portion 600 for joining the housing sections 500 together. The center portion 230, the joining portion 600 and the small trenches 800 are created together with the housing sections 500 at the time of extrusion molding of the housing case 300.

Figure 11:
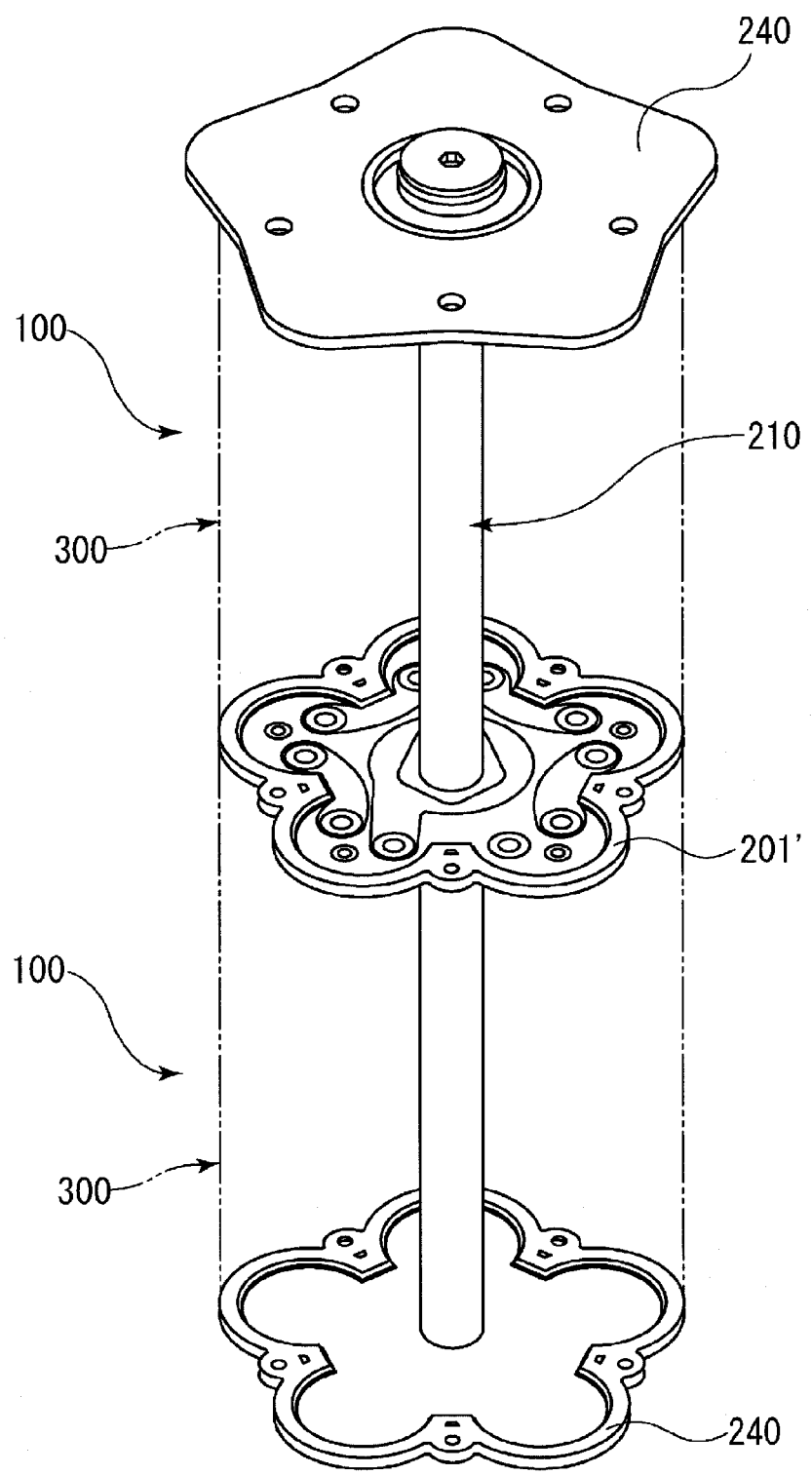
FIG. 11 is a perspective diagram showing the connection member.

As shown in FIGS. 11 and 13, the housing sections 500 and the center portion 230 penetrate through the housing case 300 from the top to the bottom. In addition, small trenches 800 are provided in order to secure the housing case 300 to the below-described circuit case 201 or the connection plate 240 by means of screws 130, and may be created from the top to the bottom of the housing case 300 or may have a certain length from the top or from the bottom of the housing case 300. In addition, the center portion 230 is placed inside the housing case 300. Auxiliary trenches 700 that are similar to the above-described small trenches 800 are created in the inner side of this center portion 230. Auxiliary members 220 in rod form for aiding the below-described connection member 210 can be provided in these auxiliary trenches 700.

Figure 14:
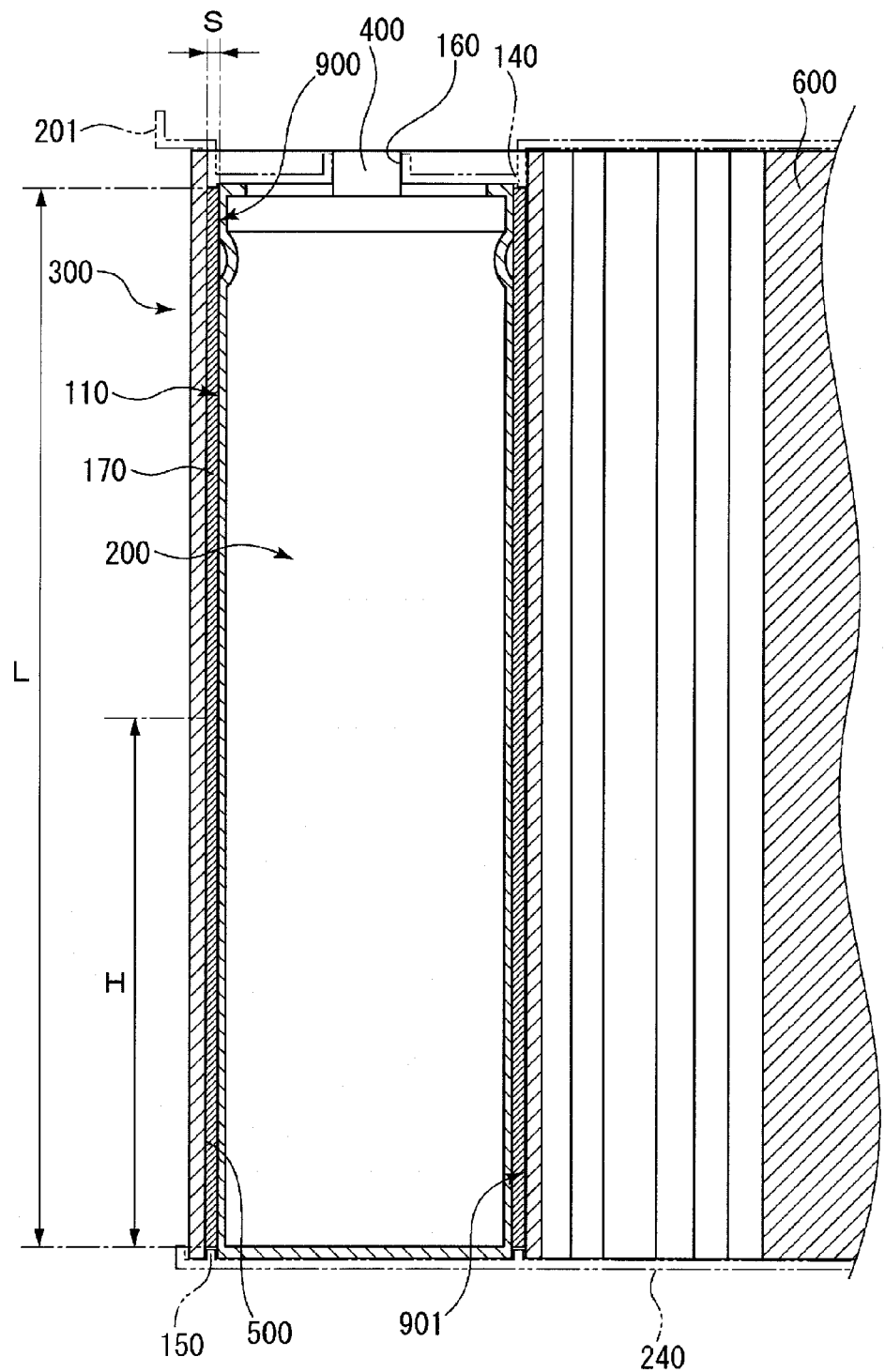
FIG. 14 is a cross-sectional diagram showing the housing case along C-C in FIG. 13 as viewed from the front.

As shown in FIGS. 13 and 14, the capacitor units 200 are inserted through the openings 900 on the top of the housing sections 500 so as to be held in such a state that the entire circumference of the sides of the capacitor units 200 is covered by the housing sections 500. Here, the outside of the housing sections 500 that form the outer periphery of the housing case 300 has a uniform thickness along the outer periphery of the capacitor units 200. In addition, the inner diameter of the housing sections 500 is slightly greater than the outer diameter of the capacitor units 200 so that gaps 110 having a predetermined size S are created between the outside of the capacitor units 200 that are housed in the housing sections 500 and the inner surface of the housing sections 500 (see FIG. 14). In the present embodiment, the size S of the gaps 110 is approximately 0.5 mm to 3.0 mm, taking into consideration the heat conductivity and the below-described efficiency for filling in the gaps with a resin.

As shown in FIG. 14, in the state where the capacitor units 200 are housed in the housing case 300, a circuit case 201 for housing a circuit substrate 190 (circuit unit) on which connection members 180 for electrically connecting the terminals 400 of the capacitor units 200 to each other (circuit unit) and a balance circuit and the like are provided is attached to the top of the housing case 300.

Here, this circuit case 201 is secured to the small trenches 800 provided in the connection portions 600 of the housing case 300 by means of screws (attachment members) (not shown). By doing this, the circuit case 201 can be secured using the small trenches 800 that are created together with the housing sections 500 at the time of extrusion molding, and thus, it is not necessary to separately create portions for attaching the circuit case 201 in the housing case 300 so that the cost for manufacturing the housing case 300 can be reduced. Though it is preferable for the material of the circuit case to be an insulating resin material of a thermosetting resin, such as an epoxy resin or a phenol resin, or of a thermoplastic resin, such as polybutylene terephthalate or nylon, the material is not limited to this, and a metal material, such as aluminum or stainless steel, may be used. From among these, a polybutylene terephthalate resin that is excellent in heat stability is preferable.

In addition, a connection plate 240 can be attached to the bottom of the housing case 300. The top and bottom openings 900 and 901 of the housing sections 500 are closed by the circuit case 201 and the connection plate 240 (see FIG. 14). Supports 140 and 150 for supporting the top and the bottom of the capacitor units 200 are formed on the circuit case 201 and the connection plate 240.

Figure 12:
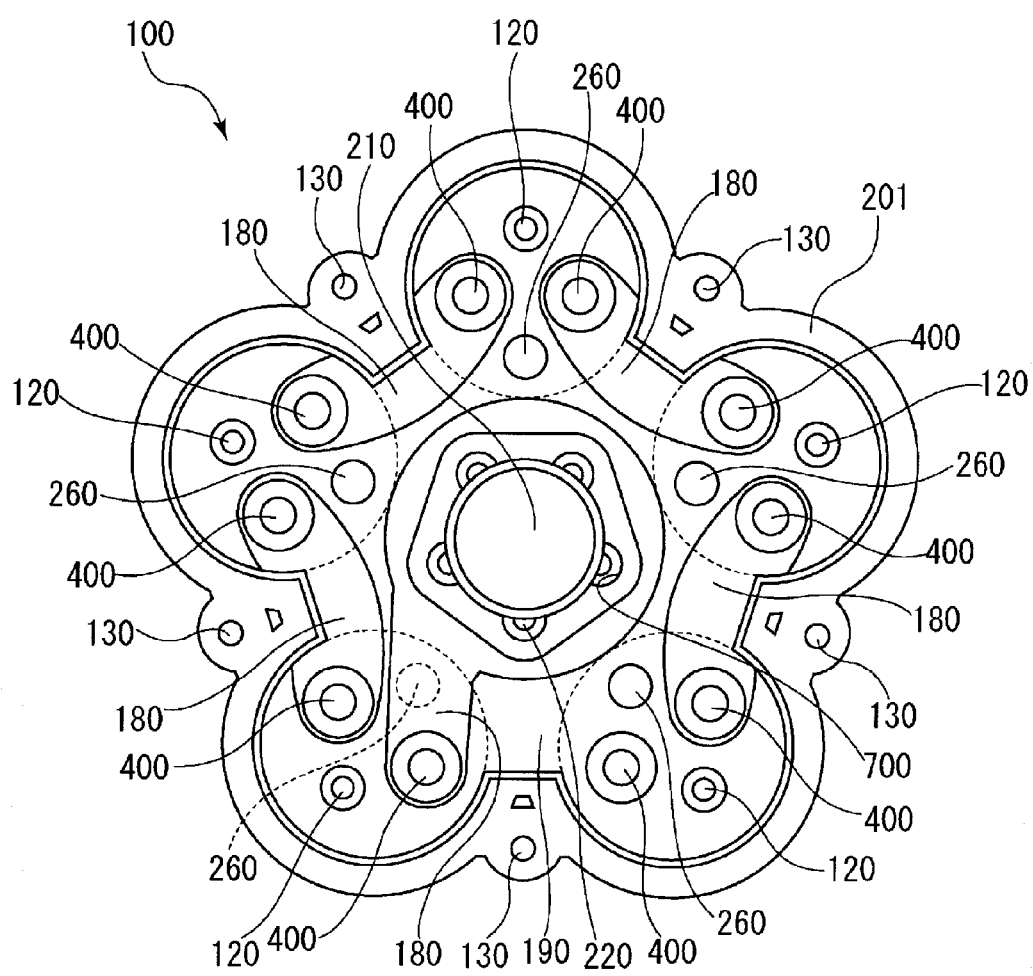
FIG. 12 is a plan diagram showing the circuit case along A-A in FIG. 10.

Here, as shown in FIG. 12, leading holes 160 for leading out the terminals 400 of the capacitor units 200, openings 120 provided in such locations as to correspond to the pressure releasing mechanisms 250 provided on the top of the capacitor units 200 (see FIG. 13), and injection holes 260 through a melted resin material 170 can be flown into are created in the circuit case 201. The pressure within a capacitor unit 200 can be released through the opening 120 when the pressure releasing mechanism 250 is in operation.

The thickness of the supports 140 and 150 is the same size as the above-described gaps 110 (see FIG. 14). These supports 140 and 150 prevent the capacitor units 200 from shaking, and the size S of the gaps 110 is uniform along the outer periphery of the capacitor units 200.

As shown in FIG. 14, the gaps 110 are filled in with a resin material 170 that is a synthetic resin having heat conductivity, such as an epoxy resin or a urethane resin. Thus, the outer periphery of the capacitor units 200 is adhered to the inner surface of the housing sections 500 with the resin material 170 in between so that the capacitor units 200 are firmly secured within the housing sections 500, and at the same time, the heat conductivity to the housing case is increased through the resin material 170, which increases the heat dissipation properties. Here, it is preferable for the entirety of the gap 110 between the outer periphery of the capacitor units 200 and the inner surfaces of the housing sections 500 to be filled in with the resin material 170.

According to one of the filling in methods for filling the gaps with this resin material 170, first, the capacitor units 200 are inserted into the housing sections 500, and then, the circuit case 201 and the connection plate 240 are attached to the top and the bottom of the housing sections 500 so that the opening 900 and 901 on the top and at the bottom of the housing sections 500 are closed, and in this state where the gaps 110 are created, a melted resin material 170 is flown into the gaps 110 through the injection holes 260 in the circuit case 201 under reduced pressure. Here, the entirety L of the gaps 110 may be filled in with the resin material 170 or the portion H that is approximately half of the gaps 110 may be filled in with the resin material 170 of which the amount for use can be appropriately changed.

Thus, the connection plate 240 can prevent the resin material 170 from flowing out before hardening, and at the same time, the supports 150 maintain the gaps 110 uniform so that the spaces around the capacitor units 200 can be uniformly filled in with the resin material 170, and thus, the strength of the connection between the capacitor units 200 and the housing sections 500 as well as the heat conductivity can be prevented from becoming uneven. Here, partitions may be provided around the pressure releasing mechanisms formed on the top of the capacitor units 2 so that the pressure releasing mechanisms are not covered by the resin material with which the gaps are filled in, or exhaust holes from the pressure releasing mechanisms to the outside of the capacitor device (such as tubes) may be provided.

Furthermore, a connection plate 240 that is the same as the connection plate 240 attached to the bottom of the housing case 300 is attached to the top of the circuit case 201 on the top of the housing case 300. In addition, capacitor devices 100 are joined together vertically so that the connection plate 240 and the circuit case 201 are provided on the top of the upper capacitor device 100, the connection plate 240 is provided at the bottom of the lower capacitor device 100, and a circuit case 201' having the same structure as the connection plates 240 is provided between the upper and lower capacitor devices 100 and 100.

Furthermore, a connection member 210 is provided in order to join and secure the upper and lower connection plates 240, 240. This connection member 210 is in rod form that runs in the longitudinal direction of the housing cases 300 of the upper and lower capacitor devices 100. Since the upper and lower capacitor devices 100 are joined together by means of the connection member 210, the capacitor devices 100 run in the longitudinal direction of the housing cases 300 so as to be compact in the direction of the width and can increase the capacitance.

The connection member 210 is provided in the above-described center portions 230 of the respective housing cases 300. This connection member 210 makes the upper and lower capacitor devices 100 join as an integrated whole. As described above, the center portions 230 are surrounded by the housing sections 500 in the outer periphery of the housing cases 300, and thus, it is not necessary for the connection member 210 in the center portions 230 to be exposed to the outside of the housing cases 300 so that the connection member 210 can be prevented from corroding, and the heat emitted from and the load of the capacitor units 200 are conveyed and applied uniformly around the connection member 210, and therefore, the connection member 210 can be prevented from distorting due to the effects of the heat or the load.

Figure 16:
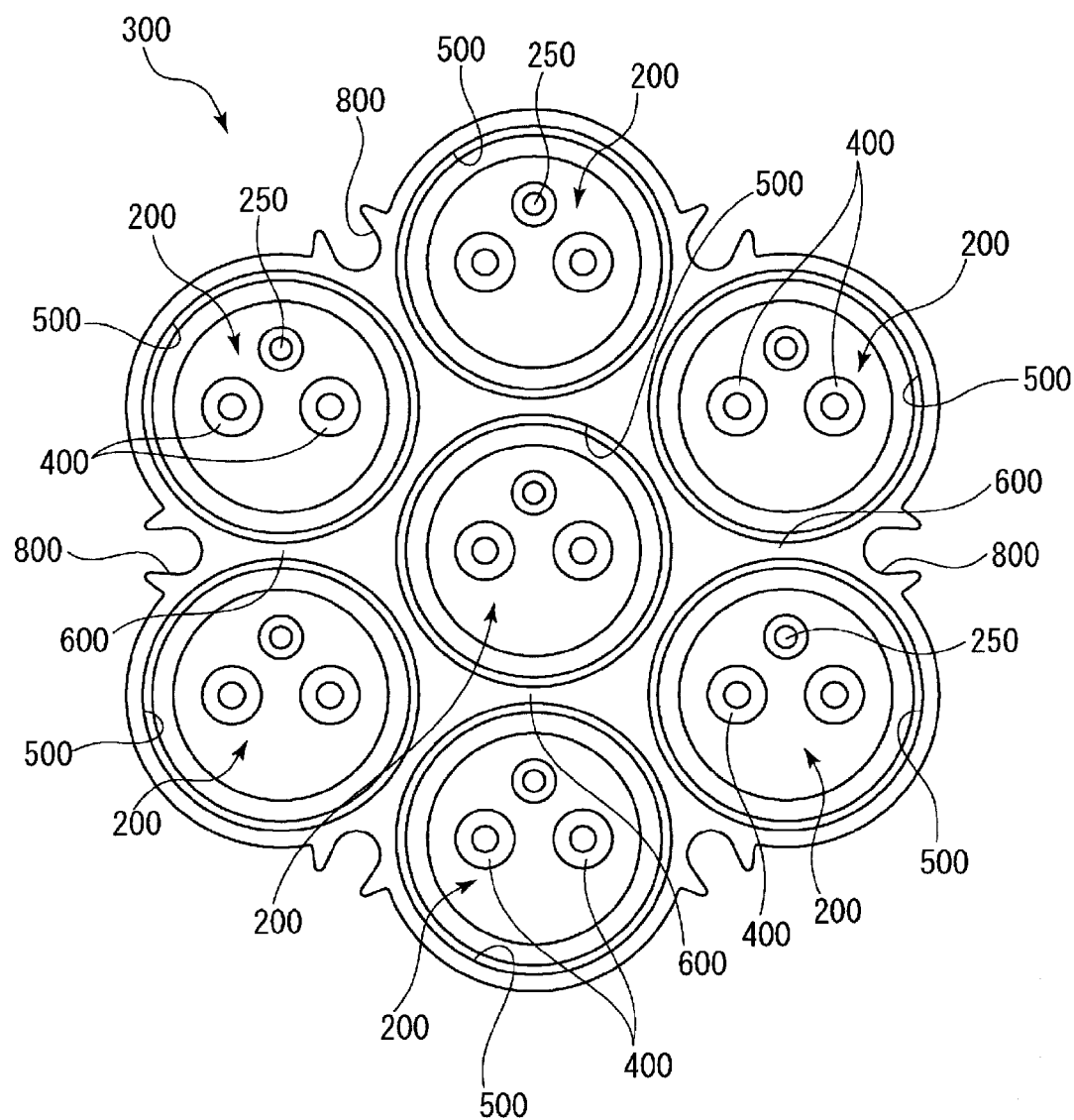
FIG. 16 is a plan diagram showing the housing case according to a modification.

Next, the capacitor device according to a modification is described in reference to FIG. 16. Here, the same symbols are attached to the same components as in the above-described embodiment, and the same descriptions are not repeated.

As shown in FIG. 16, seven housing sections 500 for housing a capacitor unit 200 are created in the housing case 300 according to the modification. One housing section 500 is created at the center of the housing case 300, and six housing sections 500 are arranged in annular form around this housing section 500 at the center. In addition, the outer part of the housing sections 500 in the outer periphery has a uniform thickness along the outer periphery of the capacitor units 200.

As described above, in the capacitor device 100 according to the second embodiment, a plurality of capacitor units 200 are joined as an integrated whole in such a state that the entire circumference of the capacitor units 200 is supported by the housing sections 500, and at the same time, the size of the housing sections 500 can be matched the size of the capacitor units 200 so that the housing sections 500 can be made slimmer and lighter. In addition, the outer part of the housing sections 500 has a uniform thickness along the outer periphery of the capacitor units 200, and the housing sections 500 for forming the outer periphery of the housing case 300 are arranged in annular form so that the strength of the housing case 300 can be increased while increasing the area of the outside of the housing case 300 and improving the heat dissipation properties.

Though the embodiments of the present invention are described in the above in reference to the drawings, implemented structures are not limited to these embodiments, and any modifications and additions can be included in the present invention as long as the gist of the present invention is not deviated from.

For example, though electric double-layer capacitors are used as the capacitors in the first and second embodiments, the capacitors to which the present invention is applied are not limited to these, and various types of capacitors, such as electrolytic capacitors and electrochemical capacitors, can be used.

Though capacitor units in cylindrical form are illustrated in the first and second embodiments, the present invention is not limited to these and can be applied to non-cylindrical capacitors, such as in prism form. In the case of capacitors in prism form, the housing sections in the housing case may be in square cylindrical form that matches the prism form so that at least the outer part of the housing sections in the outer periphery of the housing case can have a uniform thickness along the outer periphery of the capacitor units.

Though the housing case 3 is formed through extrusion molding according to the first and second embodiments, the present invention is not limited to these, and casting can be used such that a metal material, such as aluminum, is heated at a temperature that is higher than the melting point of the material so as to be converted to a liquid, which is then flown into a die, and thus, the housing case 3 is formed after cooling.

Figure 8:
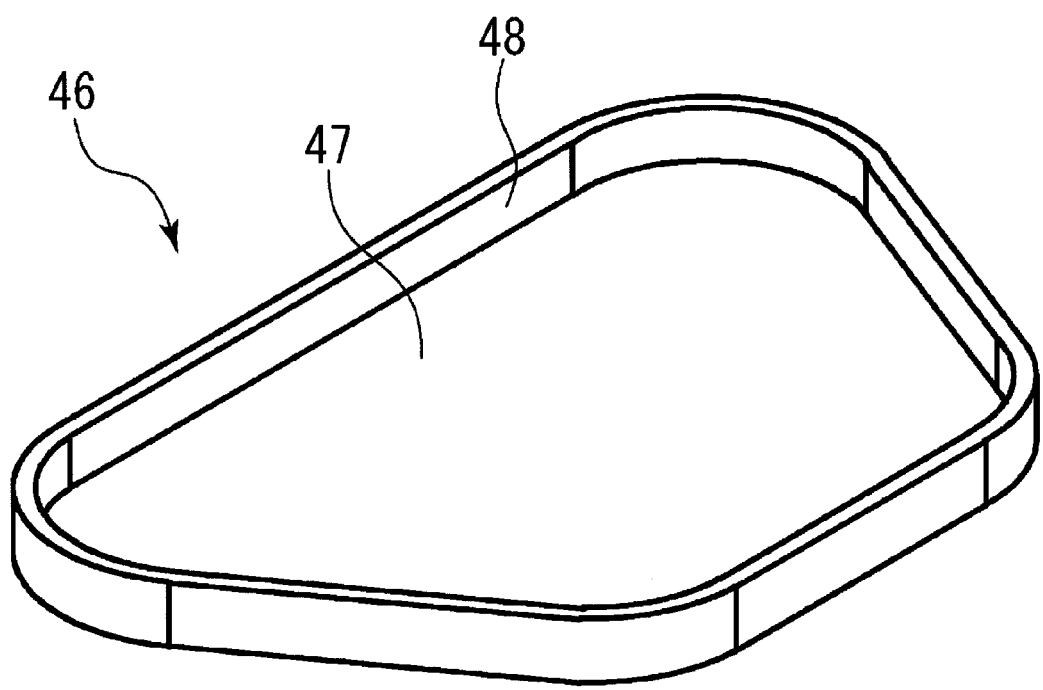
FIG. 8 is a perspective diagram showing the closing cap according to a modification.

Though upper and lower caps 12 and 13 are separately attached to the openings 9 and 10 of the housing sections 5 according to the first embodiment, as shown in FIG. 8, an integrated closing cap 46 may be used. This closing cap 46 has such a form as to cover the entirety of the top or the bottom of the housing case 3 and has a bottom plate 47 for covering the openings 10 at the bottom of the housing sections 5 and a wall 48 formed around this bottom plate 47. When an integrated closing cap 46 is thus provided, attachment to the housing case 3 is made easy.

Figure 9:
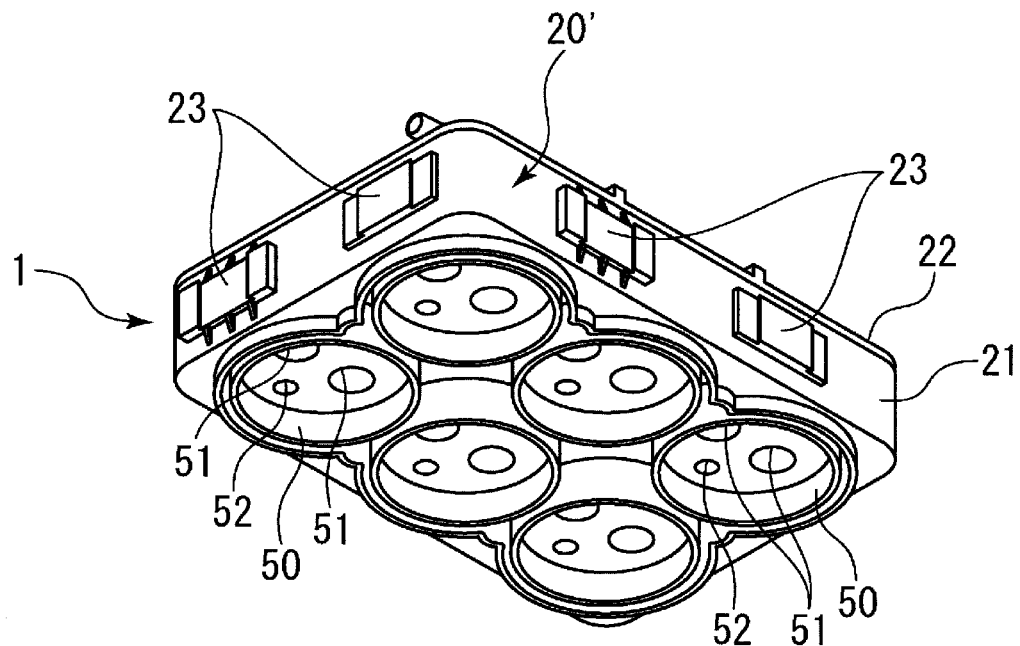
FIG. 9 is a perspective diagram showing a circuit case according to a modification.
Figure 9:
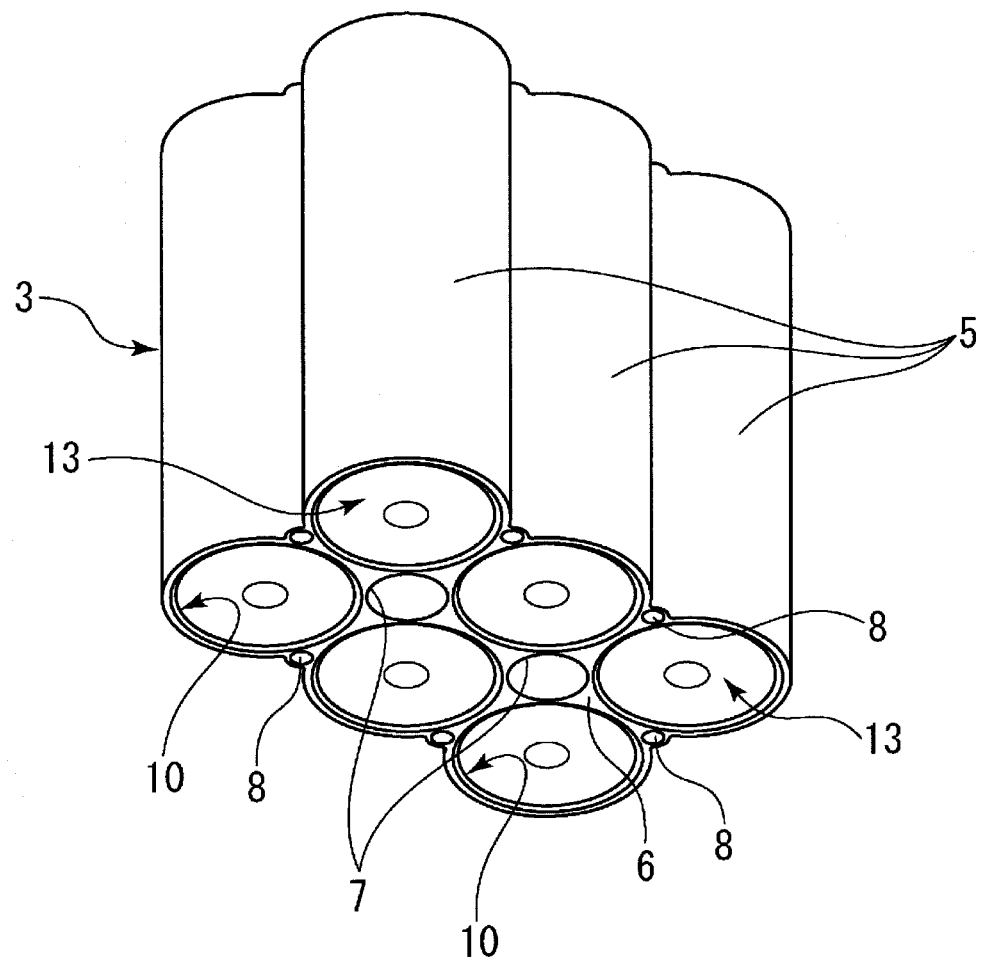

Though the upper and lower caps 12 and 13 are attached to the openings 9 and 10 of the housing sections 5 and a circuit case 20 is attached to the top of the housing case 3 according to the first embodiment, the present invention is not limited to this structure, and as shown in FIG. 9, the upper caps 12 and the circuit case 20 can have an integrated structure. By using this circuit case 20' having an integrated structure, attachment is possible in one step, unlike the first embodiment where the upper caps 12 and the circuit case 20 are attached to the housing case 3 in separate steps, and thus, the process can be made simpler. In addition, in this circuit case 20', caps 50 for closing the openings 9 of the housing sections 5, leading holes 51 for leading out the terminals 4 of the capacitor units 2, and injection holes 52 through which a melted resin material 17 can be flown into are created at the bottom of the circuit case 20'. Furthermore, the circuit case 20' is secured to the holes with a small diameter 8 provided in the joining portion 6 of the housing case 3 by means of screws, and therefore, the caps 50 in the integrated structure can be firmly secured to the housing case 3 with high precision.

Though the housing cases 3 and 300 are formed through extrusion molding according to the first and second embodiments, the present invention is not limited to these, and casting can be used such that a metal material, such as aluminum, is heated at a temperature higher than the melting point of the material so as to be converted to a liquid, which is then flown into a mold, and thus, a housing case 3 or 300 is formed after cooling. According to another method, a housing case 3 or 300 can be formed of a metal plate, such as of aluminum, through impact extrusion molding. Typically, a metal plate is placed within a lower die having a plurality of recesses, and a plurality of punches having a diameter that is smaller than that of the recesses is lowered towards the recesses so as to hit against the metal plate. The metal plate is sandwiched between the punches and the recesses in the lower die and pressed so as to change its form so that the metal plate is expanded along the sides of the punches, and a plurality of cylinders with a bottom that are joined to each other is provided. Thus, the housing case 3 or 300 having housing sections 5 or 500 in cylindrical form can be formed as shown in the embodiments. When impact extrusion molding is thus used, the time for manufacturing the housing case 3 or 300 can be shortened and the cost can be lowered.

Though in the first and second embodiments the openings 10 and 901 of the housing sections 5 and 500 in cylindrical form of the housing cases 3 and 300 are closed by attaching lower caps 13, an integrated closing cap 46 or a connection plate 240 separately to the bottom of the housing sections 5 and 500, the present invention is not limited to these, and the bottom of the housing sections 5 and 500 may be integrally formed so that housing sections 5 and 500 in cylindrical form having a bottom can be provided when the housing cases 3 and 300 are formed through extrusion molding. As a result, it is necessary to separately provide the lower caps 13, the integrated closing cap 46 or the connection plate 240, and the manufacturing process can be made simpler.

Though five housing sections 500 are created according to the second embodiment and six housing sections 500 are created around one housing section 500 at the center according to the modification of the second embodiment, the number of housing sections 500 and the arrangement thereof are not particularly limited, and any structure where housing sections 500 are arranged in annular form in the outer periphery of the housing case 300 falls within the present invention.

Though in the first and second embodiments the housing case is made of a metal material, such as aluminum, in order to increase the heat dissipation properties, the present invention is not limited to this, and the housing case may be made of a resin material. As the resin material (thermoplastic resin), polyethylene, polypropylene, polyethylene terephthalate, polybutylene terephthalate nylon, polyphenylene sulfide, acryl and polycarbonate are preferable. From among these, polypropylene and polybutylene terephthalate are preferable from the point of view of resistance to heat. In addition, additives (glass fibers) can be added to any of the various types of resin material so that the strength and the heat resistance properties can be increased.

EXPLANATION OF SYMBOLS 1, 1a capacitor device
2 capacitor unit
3, 3a housing case
5 housing section
8 hole with small diameter (attachment portion)
9, 10 opening
11 gap
12 upper cap (closing member)
13 lower cap (closing member)
14, 15 support piece (support)
17 resin material
18 connection member (circuit unit)
19 circuit substrate (circuit unit)
20, 20' circuit case

The invention claimed is:
1. A method for manufacturing a capacitor device, comprising the steps of:
　forming a plurality of capacitor units integrally housed in a housing case, wherein
　the housing case has cylindrical housing sections for housing a plurality of capacitor units, with the housing sections longitudinally aligned in the same direction and joined together by a joining portion as an integrated whole,
　a portion of the housing sections other than the joining portion is exposed on an outer side,
　the housing sections on the outer side have a uniform thickness along an outer periphery of said capacitor units,
　inserting said capacitor units via an opening at an end of the respective housing sections so that an entire circumference of the capacitor units is covered by the corresponding housing sections,
　filling in with a resin material a gap that is formed between an inner surface of said housing sections and an outer surface of said capacitor units,
　closing said opening of the housing sections by a closing member which is integrated with a circuit case for housing a circuit unit for electrically connecting said capacitor units, and
　fixing said closing member to said opening.

* * * * *